UNITED STATES PATENT OFFICE.

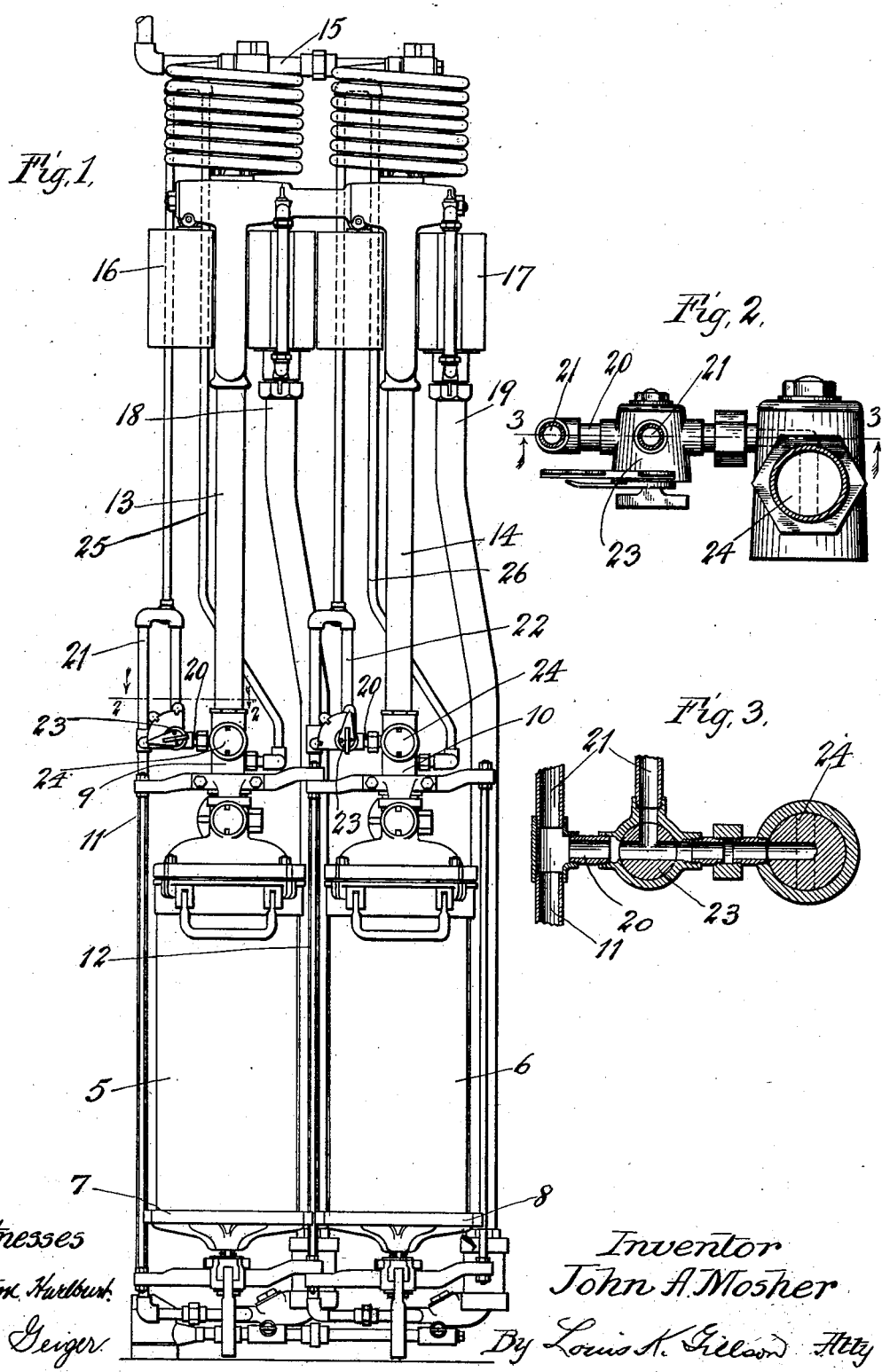

JOHN A. MOSHER, OF CHICAGO, ILLINOIS, ASSIGNOR TO THE ADAMS AND WESTLAKE COMPANY, A CORPORATION OF ILLINOIS.

ACETYLENE-GAS GENERATOR.

SPECIFICATION forming part of Letters Patent No. 701,598, dated June 3, 1902.

Application filed January 2, 1901. Serial No. 41,923. (No model.)

*To all whom it may concern:*

Be it known that I, JOHN A. MOSHER, a citizen of the United States, and a resident of Chicago, county of Cook, and State of Illinois, have invented certain new and useful Improvements in Acetylene-Generators, of which the following is a specification, and which are illustrated in the accompanying drawings, forming a part thereof.

This invention relates to that type of generators in which a removable generating-cell is employed, which is adapted to be attached to the nipple of water-feed and gas-distributing piping systems; and the object of the invention is to provide means for venting the cell should the valve of the nipple be closed so as to cut off the water-supply and the gas-pipe, so that should any generation occur, due to the presence of moisture within the cell, the gas may be carried off without necessitating its discharge through a safety-valve. This object is accomplished by the construction hereinafter described, and which is illustrated in the accompanying drawings, in which—

Figure 1 is a detail front elevation of a pair of generators. Fig. 2 is a detail plan section on the line 2 2 of Fig. 1, and Fig. 3 is a detail section on the line 3 3 of Fig. 2.

The generating-cells 5 6 are adapted to rest upon the chairs 7 8 and to engage by their nipples the nipples 9 10 of the water-feed and gas-distributing piping systems. Water is led to these cells by the pipes 11 and 12 and gas is conveyed therefrom by the pipes 13 14, which ultimately discharge into a common gas-distributing pipe 15. Water-reservoirs are shown at 16 and 17, and water is conveyed therefrom to the pipes 11 and 12 by the pipes 18 and 19, respectively. There is direct connection between the pipes 11 and 12 and the nipples 9 and 10 by means of the pipe-sections 20 20 and indirect connection therewith through the loops 21 22, leading upwardly from the pipes 11 and 12 and returning to the pipe-sections 20. A three-way cock is located at the end of the return-arm of each of these loops, so as to control both the direct connection 20 and the loop connection 21, this valve being adapted to provide either a direct or indirect feed of the water or to cut off both. As shown, the loop is open at the same time as the direct connection through the pipe 20. This is entirely immaterial, as the water will of course make its entry through the direct connection rather than through the loop, if possible. A three-way cock 24 is located in each of the nipples 9 and 10, so as to simultaneously open and close the pipes 20 and the pipes 13 or 14.

None of the features thus far described are new in this case.

The new feature of the generator consists in the vent-pipes 25 26, leading from the nipples 9 10 below the cocks 24 and each extending upwardly as a loop above the reservoirs 16 and 17 and returning enter the water-supply pipe, preferably at the loops 21 22, as shown. Should the cocks 24 or either of them be closed while the cell connected with the nipple in which such valve is located remains open and should there be any moisture present in such cell, any gas which may be generated will find its escape through the vent-pipes 25 26, and if the generation is sufficient to develop a pressure exceeding the head of water it will force the water back through the pipes and escape into the water-reservoirs, as in the case of any excess of pressure.

I claim as my invention—

1. In an acetylene-generator, in combination, water-supply and gas-distributing pipes, a nipple common to and having a valve for controlling both sets of pipes, a generating-cell adapted to engage such nipple, and a vent-pipe leading from such nipple below its valve and opening to the water-pipe.

2. In an acetylene-generator, in combination, a water-reservoir, a water-delivery pipe leading therefrom, a gas-conveying pipe, a nipple common to the water and gas pipe and having a valve for controlling both, a generating-cell adapted for attachment to the nipple, and a vent-pipe in loop form leading from the nipple below its valve to the water-pipe and extending above the reservoir.

JOHN A. MOSHER.

Witnesses:
LOUIS K. GILLSON,
E. M. KLATCHER.